(12) United States Patent
Söderström

(10) Patent No.: US 6,176,457 B1
(45) Date of Patent: Jan. 23, 2001

(54) HOLDER FOR AN OBJECT SUCH AS A MOBILE PHONE, A PALM COMPUTER OR THE LIKE

(76) Inventor: Peter Söderström, S:t Eriksterrassen 72A, Stockholm (SE), 112 34

( * ) Notice: Under 35 U.S.C. 154(b), the term of this patent shall be extended for 0 days.

(21) Appl. No.: 09/358,806

(22) Filed: Jul. 22, 1999

(51) Int. Cl.[7] .................................................. A47G 1/10
(52) U.S. Cl. ..................................... 248/316.7; 248/316.1
(58) Field of Search ............................... 248/316.1, 316.7, 248/113; 379/426, 446, 455, 454; 224/570, 929; 24/564, 569

(56) References Cited

U.S. PATENT DOCUMENTS

| | | | | |
|---|---|---|---|---|
| 1,366,324 | * | 1/1921 | Newquist | 248/113 |
| 1,459,582 | * | 6/1923 | Dubee | 248/316.1 |
| 2,332,772 | * | 10/1943 | Amer | 24/346 |
| 2,539,805 | * | 1/1951 | Allen | 248/113 |
| 4,368,912 | * | 1/1983 | Holtz | 294/87 R |
| 4,786,121 | * | 11/1988 | Lyons | 312/214 |
| 5,659,612 | * | 8/1997 | Wang | 379/446 |
| 5,832,082 | * | 11/1998 | Nagai | 379/449 |
| 5,979,724 | * | 11/1999 | Loewenthal | 224/483 |
| 6,082,687 | * | 7/2000 | Kump et al. | 248/220.41 |

\* cited by examiner

*Primary Examiner*—Ramon O. Ramirez
*Assistant Examiner*—Gwendolyn Baxter
(74) *Attorney, Agent, or Firm*—Jacobson, Price, Holman & Stern, PLLC

(57) ABSTRACT

A holder for an object (10) such as a mobile phone, a palm computer or the like, comprising a back (1) and two separate walls (2), which are generally parallel and extend the same way from the back (1), said walls (2) having on their mutually facing sides resilient engagement plate (4) for engagement with a respective side edge of the object (10). Each engagement plate (4) has the shape of a base plate (41) with a plurality of separate protruding support elements (42, 42'). The free ends of which define the free surfaces of the engagement plates. The thickness of the support elements (42, 42') is substantially less than their protrusion length from the base plate (41).

13 Claims, 1 Drawing Sheet

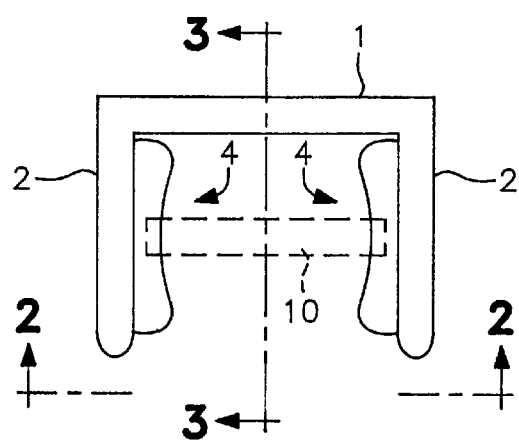
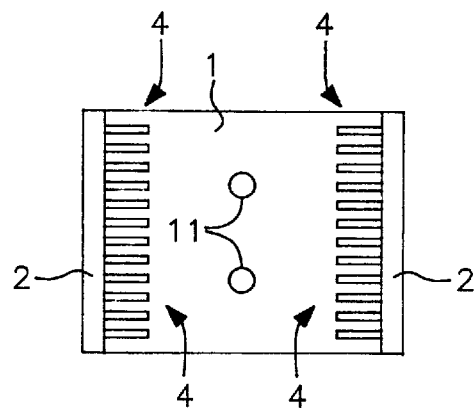
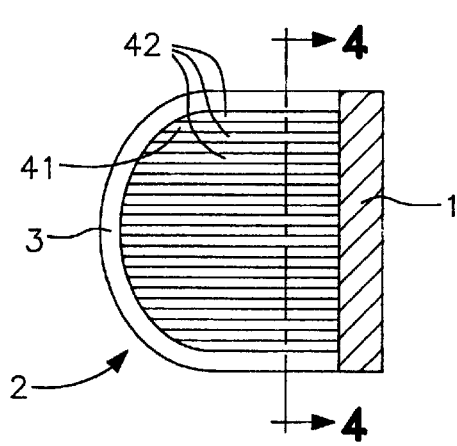
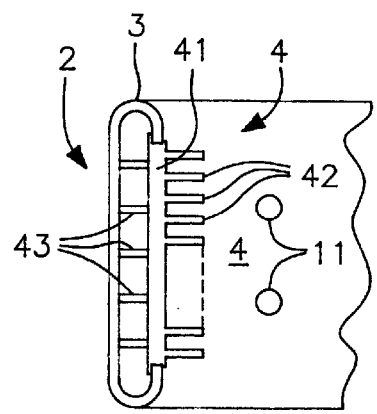
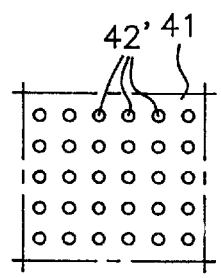

HOLDER FOR AN OBJECT SUCH AS A MOBILE PHONE, A PALM COMPUTER OR THE LIKE

BACKGROUND

1. Field of the Invention

The invention refers to a holder for an object such as a mobile phone, a palm computer or the like, having a back and two walls which are generally parallel and extend the same way from the back, the walls having on their mutually facing sides resilient engagement plates for engagement with a respective side edge of the object.

Thus, the invention concerns a holder of the type having a back plate with two separate walls, which are generally parallel and extend in the same direction from the back, said walls having on their mutually facing sides engagement plates which comprise a resilient material in order to releasably engage an object such as a mobile phone or a palm computer (docking computer) or the like.

2. Description of the Related Art

One problem with cars having several users having different mobile phones is that all these users easily and safely want to put their mobile phones in an existing holder without need of adjustment.

In automobiles and the like, a holder is often mounted on the dash panel, permitting the mobile phone to be vertically engaged in said holder.

In order to permit the holder to safely hold an object or different objects having different widths, it is well known to make the holder walls mutually displacable and to make the walls and front engagement with the object. But the adjustability by mutually displacing the walls also constitutes a problem, because it is not always obvious how the adjustment should be performed, and moreover, there is always the risk that the adjustment is made in the wrong way, which means risk that the object could be damaged when mounted in the holder, or drop down from the holder. Therefore it is preferred to provide the holder with fixed walls.

If engagement plates of foam rubber or the like are supported on mutually fixed holder walls, they must be relatively soft in order to permit easy insertion and removal of the object, but then the rubber must also have a relatively high friction coefficient against the sides of the object. This means, that such rubber plates will be worn relatively fast, wereby the holding safety will soon be decreased. This is true also when the holder is well adjusted to a certain object.

SUMMARY OF THE INVENTION

One object of the invention is to provide a durable holder with fixed walls, which permits easy and safe repetitive insertion, holding and removal of an object.

Another object of the invention is to provide a holder which can accommodate objects within a relatively large width range, without any necessity of relatively displacing the holder walls supporting the engagement plates.

These objects are achieved by the holder having a back and two separate walls which are generally parallel and extend the same way from the back, the walls having on mutually facing sides resilient engagement plates for engagement with a respective side edge of an object being held, each engagement plate having the shape of a base plate with a plurality of separate protruding support elements, the free ends of which define the free surfaces of the engagement plates, and in that the thickness of the support elements is substantially less than their protrusion length from the base plate.

Basically the invention resides in the features, that each of the resilient engagement plates has a base plate and a plurality of separate support elements, which protrude from said base plate, the free ends of said support elements defining the free surfaces of the engagement plates, and that the thickness of the support elements is substantially less than their protrusion distance from the base plate. Hereby, the support elements can be made of a relatively hard rubber, with a relatively low friction coefficient and still accomodate. The low friction coefficient means a low wear of the engagement plate as the mobile phone, palm computer or the like is inserted into and removed from the holder. Moreover, the deformation of the protruding support elements mainly by bending provides a relatively large gripping range in spite of the use of a relatively hard rubber, within a gripping force range which permits easy insertion, removal and holding of the object.

In preferred embodiments, the protruding elements could have the shape of mutually parallel strips or bands, which preferably extend in planes which are perpendicular to both the plane of the holder back and the planes of the holder walls, so that in use, these plates extend roughly in the horizontal plane. The longitudinal direction of these strips then extend in the normal direction to the plane of the holder back.

The holder walls are made to releasably receive the engagement plates. To this end, the engagement plates could be made to snapfit behind an opening edge on the inside of each wall. On the rear side, each engagement plate could have supports which engage the exterior shell of the wall.

In order to adjust the gripping width of the holder, the mobile holder could be delivered with at least one extra engagement plate and preferably a pair of gripping plates, the support elements of which have a length which differs from that of the other gripping plates.

In an other embodiment, the protruding support elements could have the shape of pins which protrude in the normal direction to the base plate of the engagement plate, similarly to the bristols of a branch.

The free ends of the protruding support elements define a generally single curved concave surface, said concave surfaces providing a natural positioning of the object in an orientation, in which it is generally parallel with the holder back, and in a position at a defined distance from the holder back. With such a concave shape of both the engagement plates, the mobile phone will be securely held even when the holder is subjected to a sharp acceleration in the forward direction.

The invention will now be closer described in connection to preferred embodiments of the inventive holder.

BRIEF DESCRIPTION OF THE DRAWINGS

FIG. 1 shows an end-view of an inventive holder.

FIG. 2 shows a view taken along line II—II in FIG. 1.

FIG. 3 shows a section taken along line III—III in FIG. 1.

FIG. 4 shows a section taken along line IV—IV in FIG. 3.

FIG. 5 illustrates schematically another embodiment of the protruding support elements of the engagement plates of the holder.

DETAILED DESCRIPTION OF THE PREFERRED EMBODIMENTS

With reference to FIGS. 1–3, a holder for an object 10 such as a mobile phone, a palm computer or the like comprises a back plate 1 and two generally parallel walls 2 each having on the inside resilient engagement plates 4 between which a mobile phone 10 can be clamped. The object 10 can be considered to have the general shape of a rectangular body having a front face which is generally parallel to the holder back 1. Thus, the object 10 has two side edges which engage the plates 4 and extend generally vertically when correctly fitted in the holder which for holding a mobile phone generally is mounted on the dash panel of an automobile so that the walls 2 and generally also the back 1 extend in vertical planes.

It is obvious to the artsman, that the engagement plates 4 have mirror symmetry in relation to a center plane which extends in parallel to the walls 2 and midway between them. If the walls 2 are made symmetrical in relation to a plane extending at right angles to the phone of FIG. 3 between the top and bottom edges of the wall 2, the plates 4 of the holder could be mutually identical.

The engagement plates 4 each consist of a base plate 41 which carries a plurality of evenly distributed support elements 42 which on FIGS. 2–4 have the shape of lamellas or strips 42.

The free edges of the strips 42 pitch a surface which engages the side edges of the object 10. The engagement surface of the plates 4 can easily be compressed towards the walls 2 to different depths with a generally constant engagement force because the deformation mainly comprises bending of the support elements 42. This provides for a wide gripping range for the holder. Because the deformation of the strips 42 basically depends on bending of the strips, a fairly hard rubber material can be used for the strips 42. The base plate 41 preferably also consists of the same rubber as the strips 42 and is integral with these. The base plate 41 has around the rim thereof a bead which snapfits around the edge of an opening on the inside of the hollow wall 2. The wall 2 has an exterior shell 3, and the base plate 41 has support tabs 43 by which the base plate 41 is supported from the exterior wall shell 3.

FIG. 1 shows that the longitudinal free edge of each strip 41 has a concave shape so as to pitch a concave gripping surface for the side edge of the mobile phone 10. This concave feature gives the object 10 an improved resistance against being pulled out from the holder (downwardly in FIG. 1), and provides a stable holding of the object.

The horizontally arranged strips are believed to provide a slightly better grip in the vertical direction.

FIG. 5 illustrates another embodiment of the protruding support elements, which in this case extend perpendicularly from the base plate 41 and have the shape of pins 42'. FIGS. 2 and 4 could also be considered to show side views of the pins 42' on FIG. 5.

Also in the embodiment of FIG. 5, a relatively hard rubber quality can be used for the plate 41 and the pins 42', whereby the wear resistance will be high, at the same time as the acceptable width range of mobile phones 10 is large.

But it should be clear that the holder is very useful also for the situation that an object, which has a specific width and is well adapted to the holder, is frequently set into the holder and removed from the holder.

The invention being thus described, it will be obvious that the same may be varied in many ways. Such variations are not to be regarded as a departure from the spirit and scope of the invention, and all such modifications as would be recognized by one skilled in the art are intended to be included within the scope of the following claims.

What is claimed is:

1. Holder for an object comprising a back and two separate walls which are generally parallel and extend outward in a common direction from the back, said walls having on their mutually facing sides a resilient engagement plate for engagement with a respective side edge of the object, wherein each engagement plate includes a base plate with a plurality of separate protruding support elements extending generally perpendicular to both the back and the walls and removably fitted to said walls, free ends of said plurality of support elements defining free surfaces of the engagement plates, said support elements shaped to be generally parallel lamellar strips having a thickness substantially less than their protrusion length from their respective base plate, whereby the free ends of the protruding support elements of a first wall of said two seperate walls are laterally spaced from the free ends of the protuding support elements of a second wall of said two separate walls.

2. The holder according to claim 1, wherein a longitudinal edge of the free ends of the strips is concave.

3. The holder according to claim 1, wherein each base plate has on its rear side support elements which support against a respective one of said walls.

4. The holder according to claim 1, wherein the engagement plates include support elements of a different length.

5. The holder according to claim 1, wherein the protrusion length of said support elements is substantially less than a distance between the mutually facing sides of the walls.

6. A holder for an electronic device comprising two spaced and generally parallel walls joined by a back, said walls extending generally perpendicularly from said back and having a resilient engagement plate on their mutually facing sides for engaging a respective side of said electronic device, each engagement plate having a base plate substantially parallel with said walls and removably fitted to respective one of said walls a plurality of separate protruding support elements extending substantially perpendicular to both the back and the walls, said support elements shaped to be generally parallel lamellar strips having a concave inner longitudinal edge and a uniform thickness which is substantially less than their protrusion length from the base plate whereby the free ends of the protuding support elements of a first wall of said two walls are laterally spaced from the free ends of the protuding support elements of a second wall of said two walls.

7. The holder according to claim 6, wherein the electronic device is a mobile phone.

8. The holder according to claim 6, wherein each base plate and its respective plurality of support elements are integrally made of a rubber material.

9. The holder according to claim 8, wherein said engagement plates are and replaceable.

10. The holder according to claim 9, wherein a rim of each base plate has a bead that snap fits around an edge of an opening on the mutually facing sides of the walls, said base plate having on its rear side support elements which support against the wall.

11. A holder for a mobile phone comprising two spaced walls joined by a back, said walls extending generally perpendicularly from said back and having on their mutually facing sides a resilient engagement plate for engaging a respective side edge of said mobile phone, each engagement plate having a base plate substantially parallel with and removably fitted to said walls and a plurality of generally parallel lamellar strips joined at their bases with the base plate and extending in a plane substantially perpendicular to both the back and the walls, said lamellar strips having a substantially uniform thickness from their free ends to their bases whereby the free ends of the protuding support elements of the first wall of said two walls are laterally spaced from the free ends of the protuding support elements of a second wall of said two walls.

12. The holder according to claim 11, wherein each base plate and its respective plurality of lamellar strips are integrally made of a rubber material.

13. The holder according to claim 11, wherein the protrusion length of said support elements is substantially less than a distance between the mutually facing sides of the walls.

* * * * *